(12) United States Patent
Klaehn et al.

(10) Patent No.: US 9,080,052 B2
(45) Date of Patent: Jul. 14, 2015

(54) PRECURSOR POLYMER COMPOSITIONS COMPRISING POLYBENZIMIDAZOLE

(71) Applicant: Battelle Energy Alliance, LLC, Idaho Falls, ID (US)

(72) Inventors: John R. Klaehn, Idaho Falls, ID (US); Eric S. Peterson, Idaho Falls, ID (US); Christopher J. Orme, Firth, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 54 days.

(21) Appl. No.: 14/014,664

(22) Filed: Aug. 30, 2013

(65) Prior Publication Data

US 2013/0345350 A1  Dec. 26, 2013

Related U.S. Application Data

(62) Division of application No. 13/045,195, filed on Mar. 10, 2011, now Pat. No. 8,541,517.

(51) Int. Cl.

| | | |
|---|---|---|
| *C08L 79/04* | (2006.01) | |
| *C08L 61/28* | (2006.01) | |
| *C08G 14/10* | (2006.01) | |
| *C08G 73/18* | (2006.01) | |
| *C08F 283/00* | (2006.01) | |

(52) U.S. Cl.
CPC  *C08L 79/04* (2013.01); *C08L 61/28* (2013.01)

(58) Field of Classification Search
USPC .................. 525/472, 509, 518, 417; 428/502; 524/593, 233, 391, 542
See application file for complete search history.

(56) References Cited

U.S. PATENT DOCUMENTS

| | | |
|---|---|---|
| 3,518,234 A | 6/1970 | Yoshida et al. |
| 3,943,125 A | 3/1976 | Gerber |
| 4,020,142 A | 4/1977 | Davis et al. |
| 4,759,986 A | 7/1988 | Marikar et al. |
| 4,898,917 A | 2/1990 | Sansone |
| 4,933,397 A | 6/1990 | Sansone et al. |
| 5,017,420 A | 5/1991 | Marikar et al. |

(Continued)

FOREIGN PATENT DOCUMENTS

WO    2010022641 A1    3/2010

OTHER PUBLICATIONS

Lin et al; "Plastic composition and its surface metalating process with selectivity"; 2010; BYD Company L;imited, Peop. Rep. China; Chem Abstract 152: 383642.*

(Continued)

*Primary Examiner* — Duc Truong
(74) *Attorney, Agent, or Firm* — TraskBritt

(57) ABSTRACT

Stable, high performance polymer compositions including polybenzimidazole (PBI) and a melamine-formaldehyde polymer, such as methylated, poly(melamine-co-formaldehyde), for forming structures such as films, fibers and bulky structures. The polymer compositions may be formed by combining polybenzimidazole with the melamine-formaldehyde polymer to form a precursor. The polybenzimidazole may be reacted and/or intertwined with the melamine-formaldehyde polymer to form the polymer composition. For example, a stable, free-standing film having a thickness of, for example, between about 5 μm and about 30 μm may be formed from the polymer composition. Such films may be used as gas separation membranes and may be submerged into water for extended periods without crazing and cracking. The polymer composition may also be used as a coating on substrates, such as metal and ceramics, or may be used for spinning fibers. Precursors for forming such polymer compositions are also disclosed.

20 Claims, 1 Drawing Sheet

(56) References Cited

U.S. PATENT DOCUMENTS

| | | |
|---|---|---|
| 6,323,301 B1 | 11/2001 | Smith et al. |
| 6,681,648 B1 | 1/2004 | Dye et al. |
| 6,946,015 B2 | 9/2005 | Jorgensen et al. |
| 6,946,019 B2 | 9/2005 | Dye et al. |
| 6,997,971 B1 | 2/2006 | Young et al. |
| 7,259,230 B2 | 8/2007 | Klaehn et al. |
| 7,309,758 B2 | 12/2007 | Klaehn et al. |
| 7,462,223 B2 | 12/2008 | Kiefer et al. |
| 7,485,227 B2 | 2/2009 | Kiefer et al. |
| 7,632,898 B2 | 12/2009 | Klaehn et al. |
| 7,665,149 B2 | 2/2010 | Carbajal et al. |
| 7,772,361 B2 | 8/2010 | Klaehn et al. |
| 2009/0220843 A1 | 9/2009 | Haring et al. |

OTHER PUBLICATIONS

Chanda et al., "Polybenzimidazole resin-based new chelating agents. Ferric ion selectivity of resins with immobilized oligoamines," Reactive Polymers, 9 (1988) 277-284.

Chanda et al., "Polybenzimidazole resin-based new chelating agents. Uranyl and ferric ion selectivity of resins with anchored dimethylglyoxime," Reactive Polymers, 11 (1989) 165-176.

Peterson et al., "Polyimide and Polybenzimidazole Derivatives for Gas Separation Applications," Idaho National Laboratory, Carbon Capture and Sequestration Conference, May 2007, 21 pages.

Rogers et al., "Studies in the Gas and Vapor Permeability of Plastic Films and Coated Papers, Parts I and II," TAPPI, Nov. 1956, vol. 39, No. 11. pp. 737-747.

Roziere et al., "Non-Fluorinated Polymer Materials for Proton Exchange Membrane Fuel Cells," Annu. Rev. Mater. Res., 2003, 33:503-55.

Schuster et al., "Anhydrous Proton-Conducting Polymers," Annu. Rev. Mater. Res., 2003, 33:233-61.

Trischler et al., "Substituted Aliphatic Polybenzimidazoles as Membrane Separator Materials," Journal of Applied Polymer Science, vol. 13, pp. 101-106 (1969).

* cited by examiner

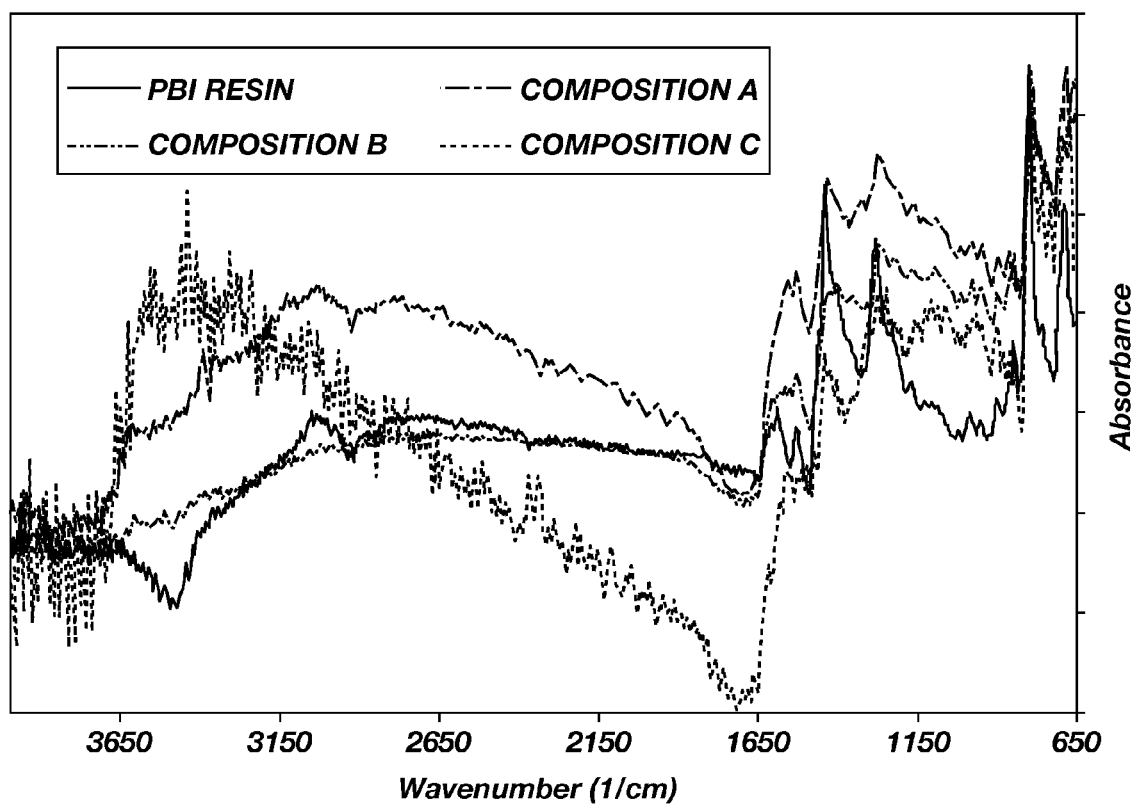

PRECURSOR POLYMER COMPOSITIONS COMPRISING POLYBENZIMIDAZOLE

CROSS-REFERENCE TO RELATED APPLICATIONS

This application is a divisional of U.S. patent application Ser. No. 13/045,195, filed Mar. 10, 2011, now U.S. Pat. No. 8,541,517, issued Sep. 24, 2013, the disclosure of which is hereby incorporated herein in its entirety by this reference.

STATEMENT REGARDING FEDERALLY SPONSORED RESEARCH OR DEVELOPMENT

This invention was made with government support under Contract Number DE-AC07-05ID14517 awarded by the United States Department of Energy. The government has certain rights in the invention.

TECHNICAL FIELD

Embodiments of the present disclosure relate to polymer compositions including polybenzimidazole, structures formed from such polymer compositions and precursors and methods for forming such polymer compositions. More particularly, the disclosure relates to N-substituted polybenzimidazole that is cross-linked with methylated, poly(melamine-co-formaldehyde) to form the polymer compositions, such as an interpenetrating polymer network.

BACKGROUND

Polybenzimidazole (PBI), or poly-2,2'(m-phenylene)-5,5'-bibenzimidazole, is a polymer that is resistant to strong acids, bases, and high temperatures (e.g., up to 500° C.). It has a heat resistance temperature above 430° C. PBI also exhibits excellent, mechanical strength, wear resistance and chemical resistance properties. Therefore, PBI can be used for applications that operate under extremely high temperature, mechanical loads and chemical corrosive environments.

PBI has been used over the past years to form membranes, electrically conductive materials, fire resistant materials, ultrafilters, and other types of separatory media. For example, fibers may be formed from PBI (i.e., PBI fibers) and woven into fabrics that are used in high temperature fire resistant suits, which are able to withstand temperatures of up to 600° C. Thin films or flat sheets of PBI are typically swollen with other solvents, such as phosphoric acid, for stability and electrical conductivity. Solid forms (e.g., rods and blocks) of PBI may also be formed by heat compression molding of a powdered PBI resin.

However, the poor film-forming characteristics of PBI have prevented use of PBI in film or coating applications. PBI has very poor solubility in conventional organic solvents, but may be dissolved in highly polar, aprotic organic solvents, such as dimethyl sulfoxide (DMSO), N,N-dimethylacetamide (DMAc), N,N-dimethylformamide (DMF), or N-methylpyrrolidinone (NMP), to form a PBI solution. PBI's molecular structure is dependent upon hydrogen bonding by its imidazole groups. Disrupting the hydrogen bonding causes crazing and cracking that is especially pronounced when forming thin, flat articles, such as films. Therefore, additives (i.e., acidic compounds or lithium salts) may be introduced to the PBI solution to stabilize the hydrogen bonding in the polymer matrix.

Most commonly, PBI is stabilized using acidic compounds, such as sulfuric acid, phosphoric acid and organic derivatives thereof. Such acidic compounds do not result in substitution of PBI with sulfate or phosphate, but instead result in protonation of a polymer backbone of PBI. While not wishing to be bound by any particular theory, it is postulated that the acidic compounds penetrate the PBI matrix, breaking up the crystal ordering. Thus, combining PBI with the acidic compounds tends to "plasticize" PBI, resulting in formation of PBI gels, which are often referred to as "dopes." The PBI gels or dopes are used in constructing PBI hydrogen fuel cells (or similar devices) where integration of water into the matrix is important for proton transport. However, a PBI gel or dope is not useful for solution casting of dry, free-standing films, especially when the resulting films will be exposed to moisture in their applications. In particular, the additives in the PBI solutions are known to cause deleterious effects, such as swelling, in PBI films when exposed to water or moisture. When the additives are not used, solution-cast PBI films tend to stress crack and fissure, especially upon exposure to increased temperatures (e.g., temperatures greater than 150° C.) due to loss of the high boiling solvent. Such difficulties have prevented the formation of free-standing films of PBI.

As an alternative to forming PBI solutions including acidic compounds, PBI may be modified at the molecular level. PBI includes imidazole groups with reactive nitrogen atoms (i.e., imidazole nitrogen atoms) that may be used for molecular substitution (i.e., grafting) or for forming new PBI polymers using aldehyde and amine precursors (monomers) prior to polymerization. Altering monomers of PBI before polymerization is difficult, and the molecular morphology of the resulting polymer may be considerably different from that of homogeneous PBI. Synthetic N-substitution of PBI after polymerization has been performed with varying success. However, additional synthetic acts and work-up procedures are required to form N-substituted PBI compounds. Furthermore, the hydrogen bonding within the polymer matrix is disrupted due to the N-substitution at the imidazole nitrogen atoms. The additives are often used to stabilize the polymer matrix of N-substituted PBI compounds, thus, complicating formation of stable free-standing films from PBI.

Polymer compositions that include PBI crosslinked and/or blended with other polymers have also been used for PBI film formation. Although blending other polymers with PBI may provide some stabilization of the polymer matrix, the majority of such polymer compositions are gels or dopes that are used for fibers or fuel cells. For example, a blend of PBI and ULTEM® 1000 polyetherimide in DMAc has been used to form fibers. However, thin films formed from such a blend phase separate, turn opaque and/or fracture without the addition of the previously described additives, especially in the presence of moisture.

BRIEF SUMMARY

In some embodiments, the present disclosure includes a polymer composition. The polymer composition may include at least one polybenzimidazole segment and at least one melamine-formaldehyde polymer segment at least partially intertwined with the at least one polybenzimidazole segment. For example, the polymer composition may include an interpenetrating polymer network (IPN) of the at least one polybenzimidazole segment and the at least one polybenzimidazole segment.

In further embodiments, the present disclosure includes a precursor of a polymer composition. The precursor comprises a solution of polybenzimidazole and methylated, poly(melamine-co-formaldehyde).

In yet further embodiments, the present disclosure includes a method for forming a polymer composition. The method comprises combining methylated, poly(melamine-co-formaldehyde) and polybenzimidazole to form a mixture and heating the mixture to form a polymer composition.

BRIEF DESCRIPTION OF THE DRAWING

While the specification concludes with claims particularly pointing out and distinctly claiming that which is regarded as the present invention, advantages of this invention may be more readily ascertained from the following detailed description when read in conjunction with the accompanying drawing in which:

FIG. 1 is a Fourier transform infrared (FT-IR) spectrum showing a comparison of polybenzimidazole and polymer compositions formed according to embodiments of the present disclosure.

DETAILED DESCRIPTION

Polymer compositions including polybenzimidazole (PBI) and a melamine-formaldehyde polymer are disclosed. The polybenzimidazole includes a plurality of imidazole functional groups, each including two nitrogen atoms to which the melamine-formaldehyde polymer may be bonded. Thus, polybenzimidazole may be substituted with, or cross-linked by, the melamine-formaldehyde polymer. In addition, segments of the polybenzimidazole and the melamine-formaldehyde polymer may be at least partially interlaced with one other. The polymer compositions may be used to form films, coatings, bulk materials (e.g., support rods) or fibers. The polymer compositions may be formulated to exhibit improved stability in comparison to conventional PBI compositions (e.g., PBI gels), which enables formation of free-standing films and coatings. For instance, the polymer compositions exhibit substantially increased resilience in comparison to conventional PBI compositions and may, thus, flex or bend as easily. The polymer compositions of the present disclosure may be substantially free of additives, such as acidic compounds or lithium salts, conventionally used to stabilize PBI compositions. The films and coatings formed from the polymer compositions, therefore, are not susceptible to swelling in the presence of water and may be submerged under water for long periods of time without degrading. A precursor of the polymer composition and a method for forming the polymer composition are also disclosed.

As used herein, the term "melamine-formaldehyde" means and includes polymers formed by a condensation reaction of melamine (2,4,6-triamino-s-triazene) with formaldehyde ($CH_2O$). Examples of such melamine-formaldehyde polymers include, but are not limited to, methylated, poly(melamine-co-formaldehyde), poly(melamine-co-formaldehyde) butylated, poly(melamine-co-formaldehyde) isobutylated, and poly(melamine-co-formaldehyde) methylated/butylated (55/45).

As used herein, the term "free-standing" means and includes an article that is physically stable and retains its shape without a support structure, such as a substrate.

As used herein, the terms "interpenetrating polymer network" and "IPN" mean and include a polymer that includes two or more polymer segments that are at least partially interlaced on a molecular scale, but are not covalently bonded to each other. The polymer segments may each include a crosslinked network of repeating structural units connected by covalent bonds. The polymer segments may be interlaced such that separation of the repeating structural units from one another involves breaking the covalent bonds.

As used herein, the term "imidazole" means and includes a 5-membered cyclic structure (i.e., ring) having two nitrogen atoms and three carbon atoms in which the nitrogen atoms are at the 1- and 3-positions on the ring, and the carbon atoms are at the 2-, 4-, and 5-positions on the ring. The nitrogen atoms of the imidazole may be referred to herein as "imidazole nitrogen atoms."

As used herein, the term "N-substituted polybenzimidazole" means and includes polybenzimidazole having a chemical substituent attached to a nitrogen atom thereof. For example, an N-substituted polybenzimidazole may include the chemical substituent (e.g., methylated, poly(melamine-co-formaldehyde)) attached to at least one of the nitrogen atoms at the 1- and 3-positions of the imidazole ring. The term "N-substitution" means and includes the acts of bonding the chemical substituent to at least one of the nitrogen atoms to form the N-substituted polybenzimidazole.

As used herein, the term "flowable" means and includes a sufficiently low viscosity at room temperature that enables a material to change shape or direction substantially uniformly in response to an external force (e.g., gravity or a weight of the material itself) such that the material readily flows out of a container or across a surface at room temperature.

As used herein, the term "permeability" means and includes a rate at which a gas passes through a membrane or film after the gas has come to equilibrium therein.

As used herein, the term "time lag" means and includes an amount of time for a gas to permeate from a feed side of a membrane or film to a permeate side of a membrane or film opposite the feed side. The time lag may be used to calculate a gas permeability of the membrane or film.

As used herein, the term "feed side" means and includes a side of a membrane or film that is exposed to a gas, for example, to determine gas permeability.

As used herein, the term "permeate side" means and includes a side of a membrane or film through which a gas permeates from the feed side after the gas has reached equilibrium in the membrane or film.

In some embodiments, the polymer composition is formed by reacting the polybenzimidazole with the melamine-formaldehyde polymer such that at least a portion of the polybenzimidazole is bonded to or cross-linked with the melamine-formaldehyde polymer. For example, the polybenzimidazole and the melamine-formaldehyde polymer may react to form an IPN. The polybenzimidazole and melamine-formaldehyde polymer may be combined and then heated to form the polymer composition. The polymer composition may be formed into a variety of structures including films, membranes, fibers or bulky structures. For example, the polymer composition may be formed into a free-standing film having a thickness of between about 0.5 μm and about 100 μm and, more particularly, between about 5 μm and about 30 μm. Structures formed from the polymer composition, such as thin films, are substantially stable and may be submerged in water for extended periods without crazing or cracking. The polymer composition enables free-standing films to be formed without additives (e.g., phosphoric acid) that are used to form conventional PBI compositions. Such thin films are, thus, useful as membranes for gas separation processes and as coatings on substrates, such as metals, fibers or ceramics.

Polybenzimidazole is a heterocyclic polymer having the following chemical structure:

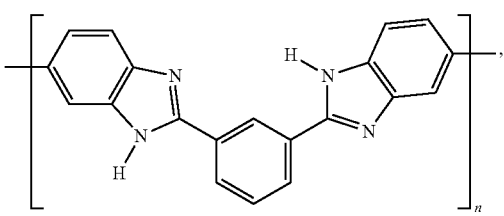

where n is a number of repeats of the polybenzimidazole monomer. For example, n may be a number between about 10 and about 210. The molecular weight range for PBI is between about 3,000 grams/mole and about 65,000 grams/mole (Daltons) and, more particularly, between about 10,000 grams/mole and about 25,000 grams/mole. The polybenzimidazole includes imidazole functional groups, each having a nitrogen atom at the 1-position and at the 3-position. During the reaction, the polybenzimidazole may be modified by N-substitution (i.e., bonding the melamine-formaldehyde polymer to at least one of the nitrogen atoms of at least one of the imidazole functional groups). The polybenzimidazole may be, for example, CELAZOLE® polybenzimidazole (PBI), which may be obtained commercially from PBI Performance Products, Inc. (Charlotte, N.C.). Commercially available polybenzimidazoles (e.g., CELAZOLE® polybenzimidazole) may include additives, such as lithium chloride, sulfuric acid, hydrochloric acid, nitric acid and phosphoric acid, for stabilization during storage. Thus, the polybenzimidazole used to form the polymer composition may be substantially pure and free from such additives. Such a polybenzimidazole may be prepared by selective polymerization of 2,3,5,6-tetraminotoluene (TAT) with various substituted and unsubstituted aromatic diacids, such as 2,5-dihydroxyterephthalic acid (DHTA).

The polybenzimidazole may be dissolved in a polar, aprotic solvent to form a polybenzimidazole solution. For example, the polar, aprotic solvent may include at least one of N,N-dimethylacetamide (DMAc), dimethyl sulfoxide (DMSO), N,N-dimethylformamide (DMF) and N-methylpyrrolidinone (NMP). In one embodiment, the polar, aprotic solvent is DMAc. The polybenzimidazole solution may include between about 0.5 percent by weight (wt%) and about 10 wt% of polybenzimidazole and, more particularly, about 2.5 wt% polybenzimidazole. Since polybenzimidazole is difficult to process without additives, the concentration of the polybenzimidazole in the polybenzimidazole solution may be optimized to provide reliable film formation. The polybenzimidazole may be stirred in the polar, aprotic solvent for a sufficient amount of time for the polybenzimidazole to dissolve. Dissolving the polybenzimidazole in the polar, aprotic solvent may provide improved processability, as will be described.

The melamine-formaldehyde polymer may be selected from a number of different polymers having different organic side groups attached at a methyoxy group. By way of example and not limitation, the organic side groups may include an alkyl, such as methyl ($CH_3$), ethyl ($C_2H_5$), propyl ($C_3H_5$), isopropyl ($C_3H_7$), butyl ($C_4H_9$), pentyl ($C_5H_{11}$), hexyl ($C_6H_{13}$), and isomers thereof. For example, the melamine-formaldehyde polymer may include at least one of methylated, poly(melamine-co-formaldehyde), poly(melamine-co-formaldehyde) butylated, poly(melamine-co-formaldehyde) isobutylated, and poly(melamine-co-formaldehyde) methylated/butylated (55/45). The organic side groups may act as leaving groups during N-substitution, as will be described.

The polybenzimidazole solution may be combined with the melamine-formaldehyde polymer to form a precursor. As a non-limiting example, the melamine-formaldehyde polymer may be methylated, poly(melamine-co-formaldehyde) (CAS Number: 68002-20-0; M-PMF), which has the following chemical structure:

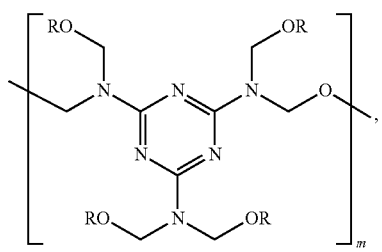

where R is independently selected from hydrogen (H) and an alkyl, such as methyl, ethyl, propyl, isopropyl, butyl, pentyl, hexyl, and isomers thereof, and m is a number of repeats of the poly(melamine-co-formaldehyde). For example, m may be a number between about 1 and about 16. As a non-limiting example, the molecular weight range for the methylated, poly(melamine-co-formaldehyde) may be between about 390 grams/mole and about 6,500 grams/mole. For example, the methylated, poly(melamine-co-formaldehyde) may be obtained commercially from Sigma-Aldrich Biotechnology L.P. (Saint Louis, Mo.).

Before combining the melamine-formaldehyde polymer and the polybenzimidazole solution, the melamine-formaldehyde polymer may be dissolved in an organic solvent, such as an ether or an alcohol, to form a melamine-formaldehyde polymer solution. In embodiments in which the melamine-formaldehyde polymer solution includes methylated, poly(melamine-co-formaldehyde), a concentration of methylated, poly(melamine-co-formaldehyde) in solution may be between about 1 wt % and about 95 wt %. For example, the melamine-formaldehyde polymer may be dissolved in butanol to form the melamine-formaldehyde polymer solution. The melamine-formaldehyde polymer solution may be combined with the polybenzimidazole solution and may be subjected to mixing to form the precursor including a polymer blend of melamine-formaldehyde polymer and polybenzimidazole in solution.

The amount of melamine-formaldehyde polymer in the precursor may be less than about 80 wt % and, more particularly, between about 10 wt % and about 50 wt %. For example, the precursor may be formed to include a ratio of the polybenzimidazole:melamine-formaldehyde polymer of between about 1:1 and about 20:1 and, more particularly, between about 2:1 to about 5:1. In embodiments in which the precursor will be used to form a bulky structure, such as a support rod, the amount of melamine-formaldehyde polymer in the precursor may be between about 1 wt % and about 80 wt %. In embodiments in which the precursor will be used to form a thin film or coating, the amount of melamine-formaldehyde polymer in the precursor may be less that about 40 wt % and, more particularly, between about 10 wt % and about 20 wt %, to provide a polymer composition exhibiting a desired strength and resiliency. Increasing the amount of melamine-formaldehyde polymer in the precursor above about 40 wt % may result in increased rigidity and brittleness in the resulting polymer composition, which may be desirable in applications in which the polymer composition will not be repeatedly subjected to flexion. If the amount of the melamine-formaldehyde polymer in the precursor is greater than about 40 wt %, the precursor may still form a clear solution and form free-standing films with varied physical properties.

The precursor may have a flowable consistency at room temperature or at a processing temperature that enables the precursor to be cast, for example, into a mold or onto a substrate. The precursor may be cast, for example, onto a substrate or into a mold. As a non-limiting example, a thin layer of the precursor may be formed over a substrate (e.g., a glass slide). As another non-limiting example, the precursor may be heated, introduced into a mold and compressed to form a bulk article, such as a support rod.

To form the polymer composition, the solvents (i.e., the polar, aprotic solvent and the organic solvent) may be removed from the precursor and the polybenzimidazole and the melamine-formaldehyde polymer may be reacted. The reaction between the polybenzimidazole and the melamine-formaldehyde polymer may be initiated by exposure to heat. While not wishing to be bound by any particular theory, it is believed that a temperature greater than a boiling point of the solvent and/or the leaving groups (i.e., the organic side groups of the melamine-formaldehyde polymer) may be used to initiate polymerization. For example, the polybenzimidazole and the melamine-formaldehyde polymer may be exposed to temperatures of less than or equal to 200° C. In embodiments in which the melamine-formaldehyde polymer is methylated, poly(melamine-co-formaldehyde), the polybenzimidazole and the methylated, poly(melamine-co-formaldehyde) may be exposed to a temperature of between about 150° C. and about 250° C. to initiate polymerization.

After initiation of polymerization, the intermediate composition may exhibit an increased viscosity in comparison to the polybenzimidazole solution. While not wishing to be bound by any particular theory, it is believed that such increased viscosity may occur as a result of stabilization of the polybenzimidazole by the melamine-formaldehyde polymer and/or cross-linking of the polybenzimidazole with the melamine-formaldehyde polymer. After casting the precursor, the solvents may be removed from the precursor by evaporation. For example, the precursor may be exposed to a temperature sufficient to accelerate vaporization of the solvents from the precursor. In embodiments in which the polybenzimidazole is dissolved in DMAc and the melamine-formaldehyde polymer is dissolved in butanol, the solvents may be evaporated from the precursor by exposing the precursor to a temperature of greater than about 150° C.

In embodiments in which the melamine-formaldehyde polymer is methylated, poly(melamine-co-formaldehyde), the reaction of the polybenzimidazole with the methylated, poly(melamine-co-formaldehyde) may proceed according to the following reaction scheme:

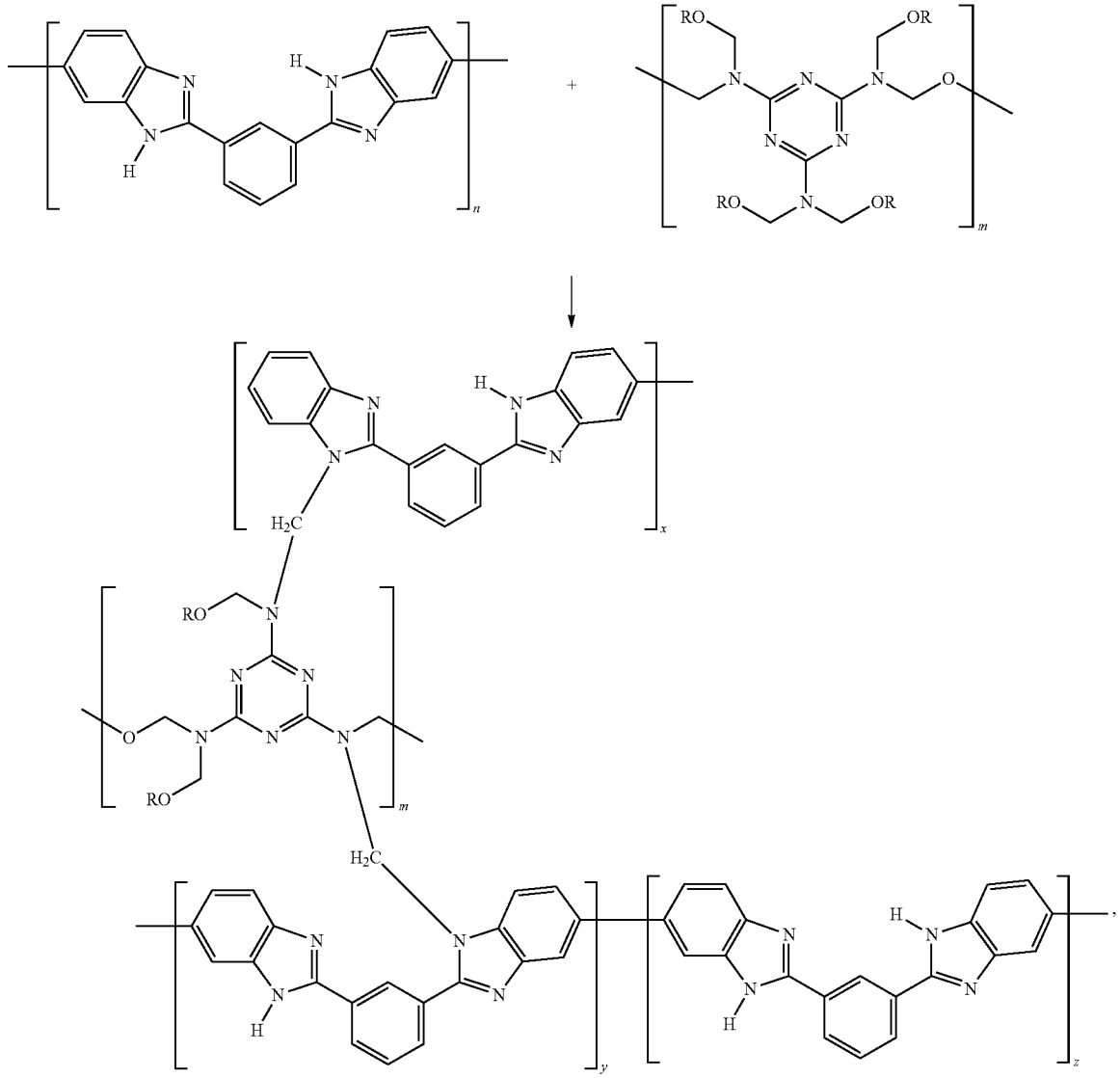

where n is a number between about 5 and about 210, m is a number between about 1 and about 16, each of x, y and z is a number between about 1 and about 500 and R is independently selected from H and an alkyl, such as methyl. During the reaction, the polybenzimidazole may be modified by N-substitution (i.e., bonding of the methylated, poly (melamine-co-formaldehyde) to at least one of the nitrogen atoms of at least one of the imidazole functional groups of the polybenzimidazole). The nitrogen atoms of the polybenzimidazole, thus, provide a reactive point for bonding of the melamine-formaldehyde polymer (e.g., the methylated, poly (melamine-co-formaldehyde). While not wishing to be bound by any particular theory, it is believed that the polybenzimidazole reacts with alcohol and/or ether linkages of the melamine-formaldehyde polymer to produce a reaction product of the polybenzimidazole and the melamine-formaldehyde polymer (i.e., the polymer composition), and water and/or methanol as a byproduct.

The polybenzimidazole and the melamine-formaldehyde polymer may react with one another as previously described to form the reaction product of the polybenzimidazole and the melamine-formaldehyde polymer (i.e., the polymer composition) that includes polybenzimidazole N-substituted with, or cross-linked by, the methylated, poly(melamine-co-formaldehyde). The reaction between the polybenzimidazole and the melamine-formaldehyde polymer may be initiated by exposing the precursor to heat. As previously described, the precursor may be exposed to a temperature of less than or equal to 250° C. to initiate the reaction.

The polybenzimidazole and the methylated, poly (melamine-co-formaldehyde), respectively, may self-polymerize to form polymer segments including the polybenzimidazole (i.e., polybenzimidazole segments) and polymer segments including the melamine-formaldehyde polymer (i.e., methylated, poly(melamine-co-formaldehyde) segments). The melamine-formaldehyde polymer may react with the imidazole nitrogen atoms of at least one polybenzimidazole segment or the polybenzimidazole to form the polymer composition. Crosslinking of the polybenzimidazole may occur when two or more of the polybenzimidazole segments or polybenzimidazole react with a single melamine-formaldehyde or melamine-formaldehyde polymer segment. For example, the polybenzimidazole and the melamine-formaldehyde polymer may polymerize to form an interpenetrating polymer network including two or more interlaced, crosslinked segments including the melamine-formaldehyde polymer and the polybenzimidazole connected by covalent bonds.

The resulting polymer composition may include some degree of crosslinking between polybenzimidazole and the melamine-formaldehyde polymer. In addition, the polymer composition may include the melamine-formaldehyde polymer segments and the polybenzimidazole segments formed, respectively, by self-polymerization of the melamine-formaldehyde polymer and the polybenzimidazole. The melamine-formaldehyde polymer and the polybenzimidazole may be attached by stable bonds that include a methylene group spacer between amines. An amount of time that the precursor may be exposed to the heat to form the polymer composition may be determined based on the amount of melamine-formaldehyde polymer in the precursor. As the amount of melamine-formaldehyde polymer in the precursor increases, the amount of time may be reduced. While not wishing to be bound by any particular theory, an increased amount of the melamine-formaldehyde polymer in the precursor may result in increased cross-linking of the polybenzimidazole by the melamine-formaldehyde polymer and increased brittleness in the resulting polymer composition.

In some embodiments, a conventional spinning process (e.g., dry-spinning, wet-spinning and dry-jet wet-spinning) may be used to form fibers of the polymer composition. As a non-limiting example, the fibers may be spun from the polymer composition into a hot nitrogen atmosphere and steam stretched in tandem with spinning. For example, the fibers may be formed by forming a precursor having the desired viscosity and evaporating the solvent from the precursor until it becomes viscous enough for fiber formation. The fibers of the polymer composition may be formed as the solvent is vaporized from the precursor. For example, such fibers may be woven to form high temperature fabrics for used in protective apparel, flight suits, foundry curtains, and aircraft furnishings. Such fibers may also be used to form a hollow fiber membrane, which may be used, for example, in membrane separation processes for treating aqueous solutions at room temperature, including wastewater treatment processes and biological membrane processes. As a non-limiting example, the hollow fiber membrane may be formed by fabricating a tubular membrane from the fibers of the polymer composition and coating the tubular membrane with an active material. The active material may be formed from the polymer composition of the present disclosure, or another suitable polymer such as polysulfone, polyethersulfone, polyimide, polyetherimide, polyacrylonitrile, polyethylene terephthalate, polybutylene terephthalate, nylon, polyphenyl sulfite, polyethylene or polypropylene.

After the reaction, the polymer composition may be dried to remove remaining liquids (i.e., water and/or the solvents). For example, the polymer composition may be exposed to a temperature of about 150° C. to evaporate remaining liquids therefrom. The polymer composition may be transparent or translucent and may have be clear, yellow to orange or light brown to brown in color.

As described in the following examples, thin films formed from the polymer composition may exhibit thermal stability (i.e., do not thermally degrade) at a temperature of up to 325° C., as well as mechanical resilience and resistance to moisture and water. It has been observed that such thin films can be exposed to water for very long periods of time (e.g., about 2 weeks) without showing stress fracturing.

The following examples serve to explain embodiments of the present invention in more detail. These examples are not to be construed as being exhaustive or exclusive as to the scope of this invention.

EXAMPLES

Example 1

Polybenzimidazole (10 grams) was pulverized into a fine powder and placed into a 250 mL round-bottom flask. The round-bottom flask was equipped with a water-jacketed condenser, a gas inlet adapter and magnetic stir bar to form a system. This system was placed under vacuum for about 4 hours and then purged with nitrogen gas. Anhydrous DMAc (about 100 mL) was transferred to the round-bottom flask and the mixture of the polybenzimidazole and the DMAc was heated to boiling with stirring for about 48 hours. The resulting solution of polybenzimidazole in DMAc was cooled to room temperature, gradually becoming more viscous.

A solution of polybenzimidazole in DMAc (10 ml; 0.0004 mol) was transferred by syringe into an 8 dram scintillation vial. Then, 0.128 g (10:1 mass ratio) of 80 wt % of methylated, poly(melamine-co-formaldehyde) in butanol (average molecular weight of about 511 g/mol) was added directly into the polybenzimidazole solution and mixed vigorously to form a precursor. The precursor included about 10 wt % of the methylated, poly(melamine-co-formaldehyde). The precursor was mixed until a substantially homogeneous state was reached. The precursor was mixed to obtain a substantially homogeneous solution. The precursor was cast onto a glass slide, and the solvent was evaporated using a temperature controlled hotplate. After evaporation of the solvent, a film exhibiting transparency and having an orange-brown color remained on the glass slide. The film was exposed to a temperature of about 150° C. for between about 24 hours to about 72 hours. During heating the polybenzimidazole and the methylated, poly(melamine-co-formaldehyde) may be at least partially cross-linked (e.g., between about 75% and about 95% cross-linked). The film was exposed to a temperature of between about 200° C. and about 250° C. for between about 6 hours and about 24 hours. The resulting film had a light brown to brown color. The film was slowly cooled to room temperature, and was then lifted from the glass slide by immersion into distilled water. The free-standing film was exposed to a temperature of about 150° C. to remove remaining water. After removal of the water, the film had a thickness of between about 10 μm and about 20 μm.

Example 2

A solution of polybenzimidazole in DMAc (10 ml; 0.0004 mol) was transferred by syringe into an 8 dram scintillation vial. Then, 0.250 g (5:1 mass ratio) of 80% by weight of methylated, poly(melamine-co-formaldehyde) in butanol is added directly into the polybenzimidazole solution and mixed vigorously to form a precursor. The precursor was mixed to obtain a substantially homogeneous solution. The precursor included about 20 wt % of the methylated, poly (melamine-co-formaldehyde). The precursor was cast onto a glass slide, and the solvent was evaporated using a temperature controlled hotplate to reach a temperature to evaporate the solvent, dimethylacetamide. After evaporation of the solvent, a film exhibiting transparency and having an orange-brown color remained on the glass slide. The film was exposed to a temperature of about 150° C. for between about 24 and about 72 hours. The film was exposed to a temperature of between about 200° C. and about 250° C. for between about 6 hours and about 24 hours. The resulting film had a light brown to brown color. The film was slowly cooled to room temperature, and was lifted from the glass plate by immersion in distilled water. The free-standing film was exposed to a temperature of about 150° C. to remove excess water.

Example 3

FIG. 1 is a Fourier transform infrared (FT-IR) spectrum showing a comparison of pure polybenzimidazole (PBI RESIN) with polymer compositions formed according to embodiments of the disclosed method. Compositions A, B and C were formed from precursors including 10 wt %, 20 wt % and 40 wt % of the methylated, poly(melamine-co-formaldehyde), respectively, in solution with the polybenzimidazole. The spectrum shows several differences between the PBI RESIN and the polymer compositions. In particular, absorbencies between about 3600 $cm^{-1}$ and about 3300 $cm^{-1}$ show that, as the concentration of the methylated, poly (melamine-co-formaldehyde) is increased in the polymer compositions (i.e., Compositions A, B and C), the methylated, poly(melamine-co-formaldehyde) dominates the polybenzimidazole absorbencies. The absorbencies between about 1300 $cm^{-1}$ and about 650 $cm^{-1}$ show differences between the PBI RESIN and each of Compositions A, B and C. The IR spectral differences demonstrate the molecular changes of PBI and include dominate signals of the melamine formaldehyde. The absorbances for PBI are less intense in comparison to those for the melamine polymer, and dominate the spectrum at the higher melamine percentages.

Example 4

Dynamic mechanical analysis (DMA) has provided additional insight into the physical properties of the polymer compositions formed according to the disclosed embodiments. Since it is difficult to obtain an accurate glass transition temperature ($T_g$) for polybenzimidazole using differential scanning calorimetry (DSC), DMA was used to approximate glass transition temperatures for the polymer compositions. Pure polybenzimidazole has a glass transition temperature of about 425° C. and a storage modulus at about 5 GPa. DMA showed that a polymer composition formed from a precursor that included about 40 wt % of the methylated, poly(melamine-co-formaldehyde) in solution with the polybenzimidazole has a glass transition temperature (i.e., a tan delta maximum) of about 350° C. While not wishing to be bound by any particular theory, it is believed that the glass transition temperature for the polymer composition is reduced in comparison to pure polybenzimidazole by incorporation of the methylated, poly(melamine-co-formaldehyde). The starting storage modulus of the polymer composition was about 20 GPa, which is significantly increased in comparison to that of the pure polybenzimidazole, suggesting that the methylated, poly(melamine-co-formaldehyde) and the polybenzimidazole are physically linked together and act synergistically. Polymer compositions having a storage modulus of greater than or equal to 10 GPa are of significant interest in the art of high performance polymers because most known polymers do not exhibit these types of strengths.

Example 5

A conventional gas permeability apparatus was used to perform a comparison of gas permeability in polymer films formed from a polyimide, polybenzimidazole, and a polymer composition including polybenzimidazole and the methylated, poly(melamine-co-formaldehyde). Polyimides are commonly used high performance polymers. For example, KAPTON® HN polyimide film, which is available commercially from E. I. du Pont de Nemours and Company (Wilmington, Del.), has been extensively used as a high performance polymer. Thus, the KAPTON® HN polyimide film was used as a control for the high temperature gas permeation analysis. The KAPTON® HN polyimide film had a thickness of about 12.5 μm.

A polybenzimidazole solution was formed by dissolving CELAZOLE® resin in DMAc. The polybenzimidazole solution was cast on a glass slide and subjected to an annealing process to form the polybenzimidazole film. However, when water was used to lift the polybenzimidazole film from the glass slide, a shattered, fragmented polybenzimidazole film resulted. Thus, the polybenzimidazole film was formed by casting the polybenzimidazole solution on a metal frit and subjecting the solution to an annealing process. The metal frit was obtained commercially from Mott Corporation (Farmington, CT). The metal frit promoted adhesion and prevented fracture of the polybenzimidazole film. The polybenzimidazole membrane had a thickness of about 20 μm.

The polymer film formed from the polymer composition including the polybenzimidazole and the methylated, poly(melamine-co-formaldehyde) ("PBI/M-PMF film") was formed from a precursor using methods similar to those described in Examples 1 and 2. A ratio of the polybenzimidazole:methylated, poly(melamine-co-formaldehyde) in the precursor was about 3:1. After evaporating the solvent from the precursor and annealing the precursor to form the PBI/M-PMF film, the PBI/M-PMF film was lifted from the glass slide using water. The PBI/M-PMF film was substantially more rugged than the polybenzimidazole film formed in the absence of the metal frit and did not shatter or fracture during the lifting process. The PBI/M-PMF film had a thickness of about 20 μm.

Characteristics of the KAPTON® HN polyimide film, the polybenzimidazole film and the PBI/M-PMF film as gas separation membranes were evaluated and compared.

Gas permeability was determined for the polymer films in a pure gas system and in a mixed gas system using a conventional time-lag method. In the pure gas system, each of the polymer films was separately exposed to hydrogen ($H_2$), methane ($CH_4$) and carbon dioxide ($CO_2$) to determine the permeability of the polymer membranes to each of these gases. Both sides of the polymer film being tested were evacuated to an equal vacuum pressure in a test cell. The test cell was then isolated and the pressure at time zero used as a baseline. A feed side of each of the polymer films was separately exposed to hydrogen ($H_2$), methane ($CH_4$) or carbon dioxide ($CO_2$), and pressure buildup on a permeate side of the polymer film opposite the feed side was recorded as a function of time. The permeability data was obtained at a temperature of about 30° C. and a feed gas pressure of about 30 psi. Table 1 summarizes selectivity and permeability determined directly from the pure gas system.

TABLE 1

| | Permeability (barrers)[a] | | | | | | Selectivity α | |
|---|---|---|---|---|---|---|---|---|
| Polymer Film | $H_2$ | $N_2$ | $O_2$ | $CH_4$ | $CO_2$ | $CO_2$ | $H_2/CO_2/CH_4$ | $H_2/CH_4$ |
| KAPTON ® HN polyimide film | 1.56 | 0.01 | 0.075 | 0.008 | 0.297 | 5.3 | 37.1 | 195.0 |
| PBI film | 4.6 | 0.12 | 0.29 | 0.13 | 0.85 | 5.4 | 6.5 | 35.4 |
| PBI/M-PMF film | 2.07 | N/A | N/A | 0.002[b] | 0.08 | 25.8 | 40.4 | 1034[b] |

[a]Permeabilities measured in barrers: [$(10^{-10})((cm^3 (STP) \times cm)/(cm^2 \times sec \times cmHg))$]
[b]Data are at instrument detection limits In the mixed gas system, permeability was determined analytically by gas chromatography to detect gas concentrations. Each of the polymer films was exposed to gas pairs including hydrogen and carbon dioxide ($H_2/CO_2$), carbon dioxide and methane ($CO_2/CH_4$) and hydrogen and methane ($H_2/CH_4$), to determine permeability of the polymer films to each of the gas pairs. Helium was used as a carrier gas to sweep the mixed gas pairs from a surface of the polymer films. The mixed gas system may reach temperatures of up to about 400° C. Thus, the mixed gas system was used to perform gas permeation analysis at high temperatures (i.e., at temperatures of greater than 70° C.).

The polymer films were separately exposed to each of the gas pairs using a conventional mixed gas permeation apparatus at a temperature of about 250° C. for about 20 hours. Table 2 summarizes selectivity and permeability determined directly from the mixed gas system at 250° C.

TABLE 2

| | Permeability (barrers)[a] | | | Selectivity α | | |
|---|---|---|---|---|---|---|
| Polymer Film | $H_2$ | $CH_4$ | $CO_2$ | $H_2/CO_2$ | $CO_2/CH_4$ | $H_2/CH_4$ |
| KAPTON ® HN polyimide film | 37.5 | 4.1 | 11.8 | 3.2 | 2.8 | 9.2 |
| PBI film | 33.1 | 1.69 | 4.7 | 7.1 | 2.8 | 2.8 |
| PBI/M-PMF film | 56.8 | 0.69 | 4.39 | 12.9 | 6.4 | 82.3 |

[a]Permeabilities measured in barrers: [$(10^{-10})((cm^3 (STP) \times cm)/(cm^2 \times sec \times cmHg))$]

As shown in Tables 1 and 2, in comparison to the KAPTON® HN polyimide film and the polybenzimidazole film, the PBI/M-PMF film exhibited substantially increased gas selectivity (α) for each of hydrogen, methane and carbon dioxide. As shown in Table 2, the PBI/M-PMF film provided a substantial increase in the gas selectivity in comparison to the polybenzimidazole film at 250° C. The gas selectivity of the PBI/M-PMF film is substantially greater than many conventional high performance polymers (e.g., the KAPTON® HN polyimide). The PBI/M-PMF film exhibited increased selectivity for $H_2$ over $CO_2$ (α=12.9), $CO_2$ over $CH_4$ (α=6.4) and $H_2$ over $CH_4$ (α=82.3) at 250° C. in comparison to the KAPTON® HN polymer film and the PBI polymer film. In addition, the PBUM-PMF film retained its physical properties (e.g., resistance to organic solvents and chemical and thermal stability) during exposure to the gases.

Table 3 provides a summary of the gas permeability of the PBI/M-PMF film over time. As shown in Table 3, hydrogen permeability and $H_2/CO_2$ separation factor of the PBI/M-PMF film significantly increased over time, whereas carbon dioxide permeability, methane permeability and $CO_2/CH_2$ separation factor remained substantially constant. Overall, the data shown in Table 3 demonstrated that the PBI/M-PMF film will be able to perform as a gas separation membrane for long periods of time (i.e., at least 20 hours) without losing gas selectivity.

TABLE 3

| Time | Permeability (Barrers) | | | Separation Factor | |
|---|---|---|---|---|---|
| (hrs) | $H_2$ | $CO_2$ | $CH_4$ | $CO_2/CH_4$ | $H_2/CO_2$ |
| 2 | 34.77 | 4.36 | 0.72 | 6.1 | 8.0 |
| 4 | 36.91 | 4.03 | 0.6 | 6.7 | 9.2 |
| 6 | 38.4 | 3.85 | 0.54 | 7.1 | 10.0 |
| 8 | 54.41 | 3.92 | 0.56 | 7.0 | 13.9 |
| 10 | 43.31 | 3.97 | 0.67 | 5.9 | 10.9 |
| 12 | 49.15 | 4.52 | 0.62 | 7.3 | 10.9 |
| 14 | 51.91 | 4.67 | 0.8 | 5.8 | 11.1 |
| 16 | 51.83 | 4.05 | 0.61 | 6.6 | 12.8 |
| 18 | 54.33 | 4.06 | 0.63 | 6.4 | 13.4 |
| 20 | 56.79 | 4.39 | 0.69 | 6.4 | 12.9 |

While the invention is susceptible to various modifications and implementation in alternative forms, specific embodiments have been shown by way of non-limiting example in the drawing and have been described in detail herein. It should be understood that the invention is not intended to be limited to the particular forms disclosed. Rather, the invention includes all modifications, equivalents, and alternatives falling within the scope of the following appended claims and their legal equivalents.

What is claimed is:

1. A precursor of a polymer composition, the precursor comprising, before reaction, a solution of polybenzimidazole and a melamine-formaldehyde polymer.

2. The precursor of claim 1, wherein the melamine-formaldehyde polymer comprises methylated, poly(melamine-co-formaldehyde).

3. The precursor of claim 1, wherein the solution consists of the polybenzimidazole, methylated, poly(melamine-co-formaldehyde), and at least one solvent.

4. The precursor of claim 3, wherein the at least one solvent comprises at least one of a polar, aprotic solvent and an organic solvent.

5. The precursor of claim 1, wherein the polybenzimidazole and the melamine-formaldehyde polymer are homogeneously dispersed in at least one solvent.

6. The precursor of claim 1, wherein the solution is formulated to comprise less than or equal to about 40% by weight of the melamine-formaldehyde polymer.

7. The precursor of claim 1, wherein the solution is formulated to comprise a ratio of between about 2:1 and about 10:1 of polybenzimidazole: melamine-formaldehyde polymer.

8. The precursor of claim 1, wherein a viscosity of the solution of polybenzimidazole and the melamine-formaldehyde polymer is sufficiently low to change shape under its own weight.

9. The precursor of claim 1, wherein the solution is substantially free of acidic compounds and lithium salts.

10. The precursor of claim 1, wherein the melamine-formaldehyde polymer comprises poly(melamine-co-formaldehyde) butylated, poly(melamine-co-formaldehyde) isobutylated, or poly(melamine-co-formaldehyde) methylated/butylated (55/45).

11. The precursor of claim 4, wherein the polar, aprotic solvent comprises at least one of N,N-dimethylacetamide (DMAc), dimethyl sulfoxide (DMSO), N,N-dimethylformamide (DMF) and N-methylpyrrolidinone (NMP).

12. The precursor of claim 4, wherein the organic solvent comprises an ether or an alcohol.

13. The precursor of claim 1, wherein the precursor comprises a polybenzimidazole solution and a melamine-formaldehyde polymer solution.

14. The precursor of claim 13, wherein the polybenzimidazole solution comprises the polybenzimidazole in a polar, aprotic solvent, and the melamine-formaldehyde polymer solution comprises the melamine-formaldehyde polymer in an organic solvent.

15. The precursor of claim 13, wherein the polybenzimidazole solution comprises between about 0.5% by weight and about 10% by weight of polybenzimidazole.

16. The precursor of claim 1, wherein the precursor consists of the polybenzimidazole, methylated, poly(melamine-co-formaldehyde), a polar, aprotic solvent, and an organic solvent.

17. The precursor of claim 1, wherein the precursor comprises a ratio of between about 1:1 and about 20:1 of polybenzimidazole: melamine-formaldehyde polymer.

18. The precursor of claim 1, wherein the precursor comprises a ratio of between about 2:1 and about 5:1 of polybenzimidazole: melamine-formaldehyde polymer.

19. The precursor of claim 1, wherein the precursor comprises between about 10% by weight and about 20% by weight of the melamine-formaldehyde polymer.

20. A precursor of a polymer composition, the precursor comprising a solution of polybenzimidazole and a melamine-formaldehyde polymer in at least one of N, N-dimethylacetamide (DMAc), dimethyl sulfoxide (DMSO), N,N-dimethylformamide (DMF), N-methylpyrrolidinone (NMP), an ether, and an alcohol.

* * * * *